March 24, 1936.  A. O. McCOLLUM  2,035,328
GEAR SHIFTING MECHANISM
Filed Jan. 30, 1933   4 Sheets-Sheet 1
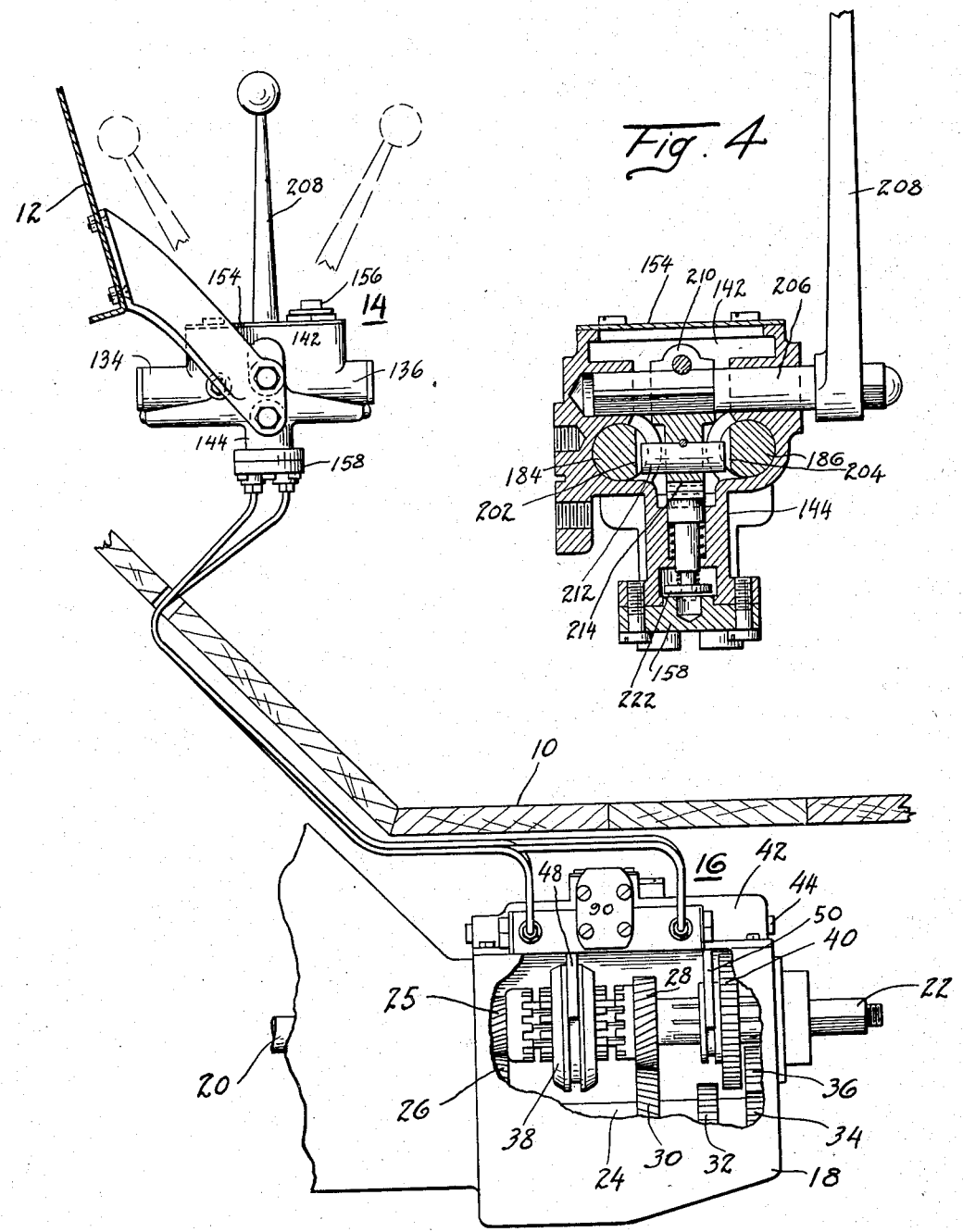
INVENTOR.
ANDREW O. McCOLLUM
BY  O. H. Fowler
ATTORNEY.

March 24, 1936.  A. O. McCOLLUM  2,035,328
GEAR SHIFTING MECHANISM
Filed Jan. 30, 1933  4 Sheets-Sheet 2
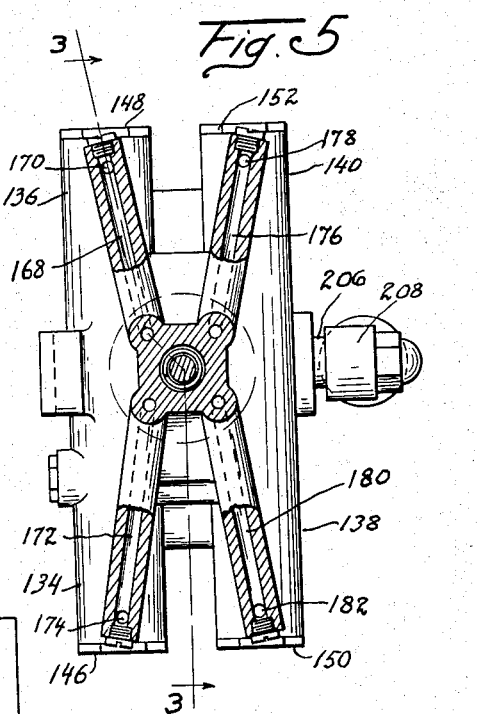
Fig. 5
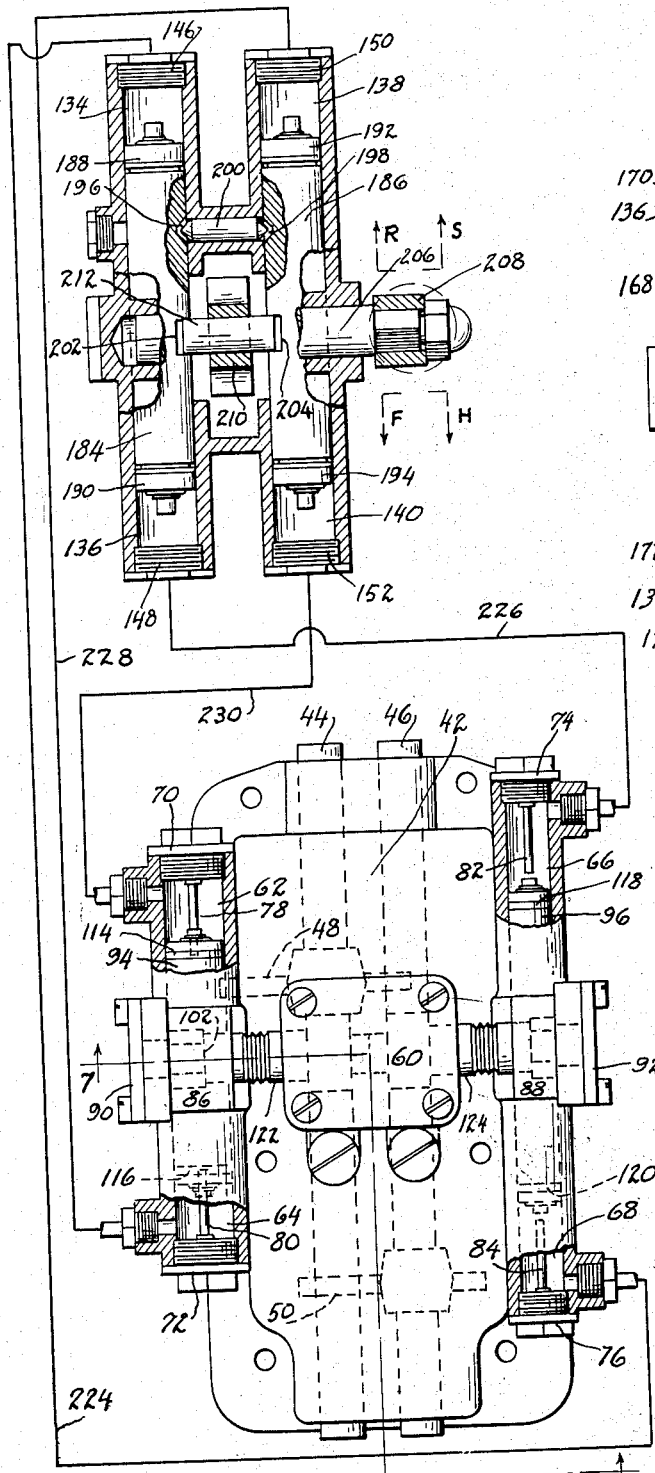
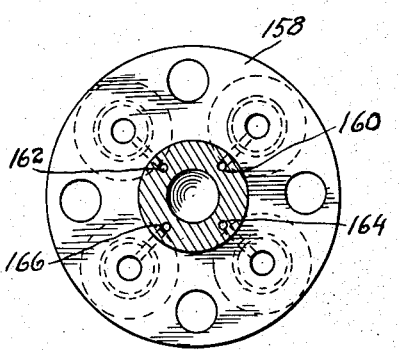
Fig. 6
Fig. 2
INVENTOR.
ANDREW O. McCOLLUM
BY C. H. Fowler
ATTORNEY.

March 24, 1936.  A. O. McCOLLUM  2,035,328

GEAR SHIFTING MECHANISM

Filed Jan. 30, 1933  4 Sheets-Sheet 3

INVENTOR.
ANDREW O. McCOLLUM
BY
ATTORNEY.

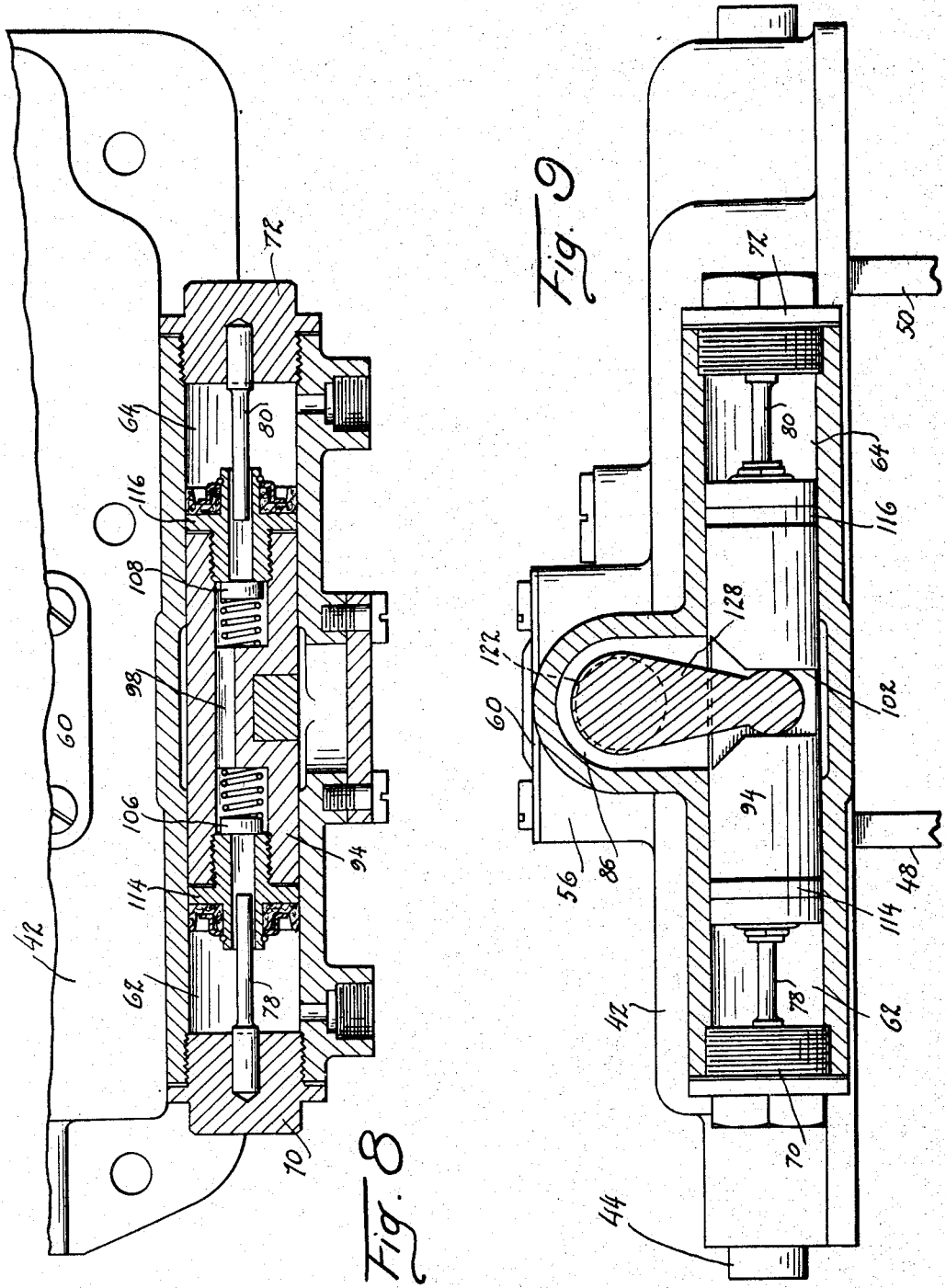

Patented Mar. 24, 1936

2,035,328

UNITED STATES PATENT OFFICE 2,035,328

GEAR SHIFTING MECHANISM

Andrew O. McCollum, Detroit, Mich., assignor to Hydraulic Brake Company, Detroit, Mich., a corporation of California Application January 30, 1933, Serial No. 654,344

7 Claims. (Cl. 60—54.5)

This invention relates to gear shifting mechanisms and more particularly to hydraulic mechanisms for shifting gears.

The invention comprehends means for shifting the gears of a motor vehicle transmission including a remote control means. A preferred embodiment of the invention includes hydraulically actuated pistons arranged in parallelism with the shifting rods of a motor vehicle transmission and so connected or coupled to the rods that upon movement of the pistons the rods are moved correspondingly. The pistons are actuated through a remote control including fluid pressure producing means comprising a plurality of cylinders, pistons in the cylinders, and means for selectively actuating the pistons to displace fluid and thereby impose pressure in the cylinders coupled to the shifting rods.

The invention aims to provide a hydraulic gear shifting mechanism in which movement of the gears is accomplished, and so timed that clashing of the gears is rendered impossible. The fluid pressure producing mechanism or the actuating mechanism and the fluid pressure actuated mechanism are so constructed, arranged and connected that excessive pressures will not develop in either of these mechanisms or in the pipe lines connecting the mechanisms.

An object of the invention is to provide a gear shifting mechanism including a remote control comprising a fluid pressure producing mechanism.

Another object of the invention is to provide a fluid pressure producing mechanism and a fluid pressure actuated mechanism and to so arrange and connect the mechanisms to effectively shift the gears of a motor vehicle transmission.

A further object of the invention is to provide a fluid pressure producing mechanism and a fluid pressure actuated mechanism for shifting the gears of a motor vehicle transmission and to so construct, arrange and connect these instrumentalities that excessive pressure will not develop during operation thereof.

Other objects and structural details of the invention will appear from the subjoined description taken in connection with the drawings, forming a part of this specification, and in which:

Figure 1 is a side elevation of the complete structure installed on a motor vehicle, parts of the vehicle being broken away and parts in section.

Figure 2 is a diagrammatical illustration of the complete structure showing parts of the mechanisms in section and part in elevation.

Figure 4 is a vertical sectional view substantially on line 4—4, Figure 3.

Figure 5 is a sectional view of the fluid pressure actuating mechanism substantially on line 5—5, Figure 3.

Figure 6 is a sectional view substantially on line 6—6, Figure 3.

Figure 8 is a sectional view of the fluid pressure actuated mechanism substantially on line 8—8, Figure 7, and Figure 9 is a vertical sectional view of the fluid pressure actuated mechanism substantially on line 9—9, Figure 7.

Figure 3:
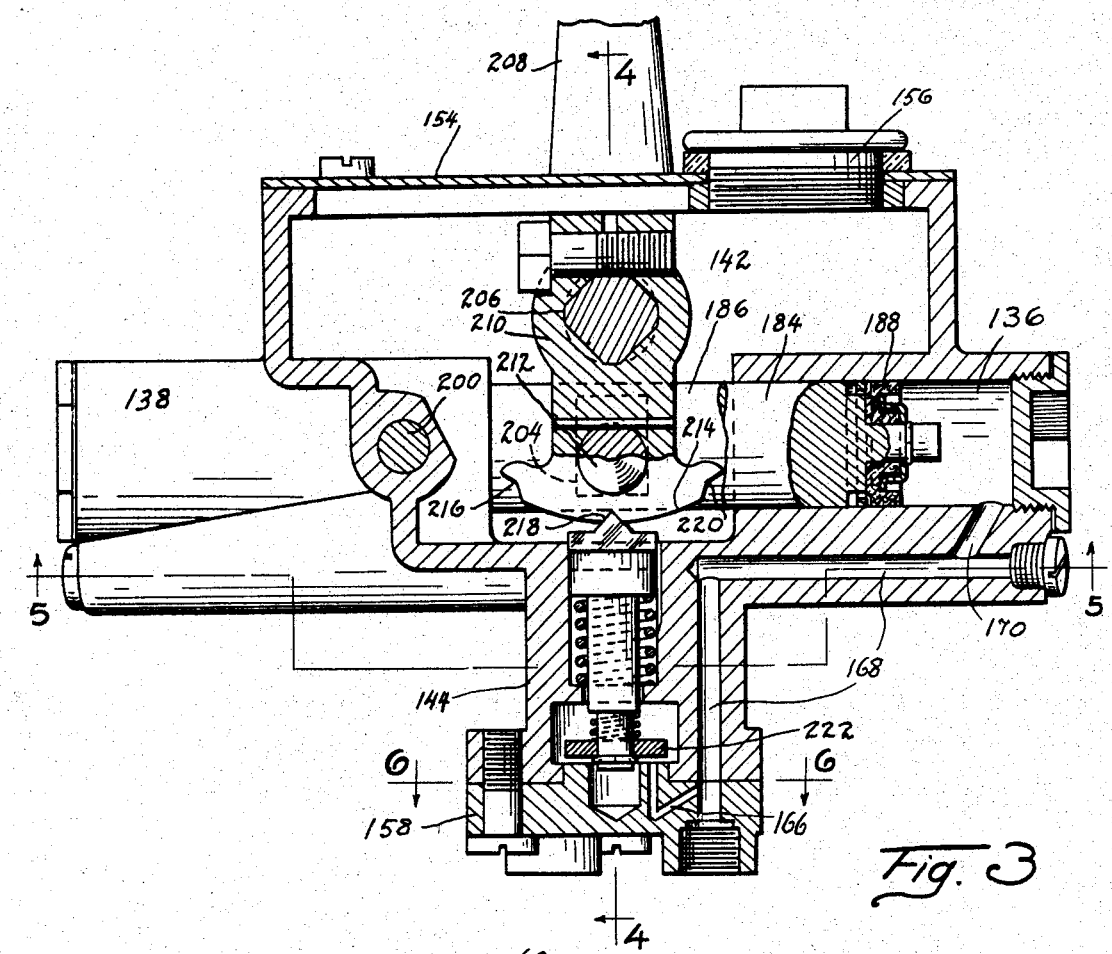
Figure 3 is a vertical sectional view of the fluid pressure producing mechanism substantially on line 3—3, Figure 5.
Figure 7:
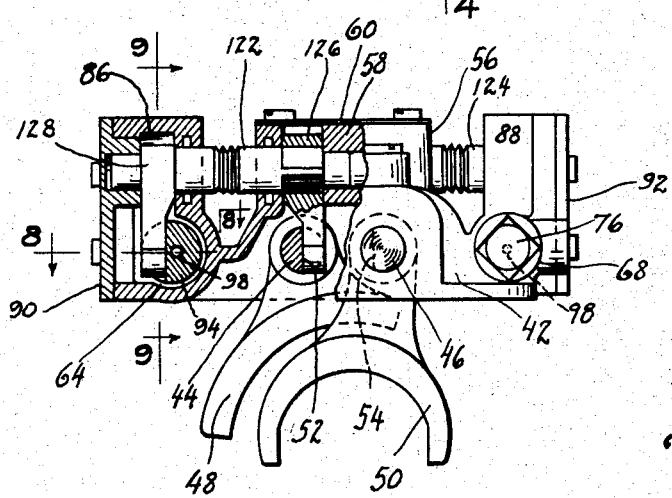
Figure 7 is a cross-sectional view of the fluid pressure actuated mechanism substantially on line 7—7, Figure 2.

Referring to the drawings for more specific details of the invention, 10 represents the floor boards of a motor vehicle body and 12 an instrument board arranged within the body. A fluid pressure producing mechanism indicated generally at 14 is suitably secured to the instrument board and connected as by pipe lines to a fluid pressure actuated mechanism indicated generally at 16 bolted or otherwise secured to the top of a transmission housing 18.

The transmission housing has journaled therein a driving shaft 20, a driven shaft 22 and a counter or jack shaft 24. The driving shaft has secured thereto a driving gear 25 in constant mesh with a gear 26 secured to the jack shaft. Rotatably supported on the driven shaft is a gear 28 in constant mesh with a gear 30 keyed to the counter shaft. The counter shaft also has secured thereon a gear 32 and a gear 34, the latter being in mesh with an idle or reverse gear 36.

The driven shaft has splined thereon a clutch 38 and a gear 40. The gear 40 may be shifted rearwardly to mesh with the idle or reverse gear 36 for the reverse speed position, or the gear 40 may be shifted forward to engage the gear 32 for the first forward speed position, and the clutch 38 may be shifted rearwardly to engage the gear 28 to lock this gear to the driven shaft to drive the transmission through the gear 30, which is the second forward speed position, or, the clutch 38 may be shifted forward to engage the gear 25 for the third forward or high speed position. This mechanism is the conventional motor vehicle transmission and forms no part of the present invention.

The transmission housing 18 has bolted or otherwise secured thereto a fluid pressure actuated mechanism including a cover plate 42 comprising a casting in which are slidably mounted parallel shifting rods 44 and 46. The rod 44 has secured thereto a member 48 engaging the clutch 38, and the rod 46 has secured thereto a member 50 engaging the gear 40, so that, upon shifting, the rod 44 or 46, the clutch 38 or the gear 40 is shifted correspondingly. As shown, the shifting rods 44 and 46 have cut-away portions 52 and 54 arranged in oppositely disposed relation substantially centrally of the rods, the object of which will hereinafter appear.

The cover plate 42 has a chamber 56 provided with a web 58 and an opening closed as by a cover plate 60, and formed as a part of the cover plate 42 are two sets of opposed cylinders 62, 64, 66, and 68 in parallelism with the shifting rods 44 and 46. The respective cylinders have threaded therein heads 70, 72, 74 and 76 supporting respectively pins 78, 80, 82 and 84, the object of which will hereinafter appear. As shown, the cylinders are connected in pairs by chambers 86 and 88 having openings closed as by cover plates 90 and 92, and the chambers 86 and 88 are arranged in alignment with the chamber 56.

Pistons 94 and 96 are positioned for reciprocation in the cylinders. Each of the pistons includes a cylindrical body portion having a longitudinal bore 98 and a slot or notch 102 arranged equidistant between the respective ends of the body portion. Each of the bores 98 has an increased diameter at the respective ends of the body portion of the piston for the reception of spring-pressed valves 106, 108, and piston heads 114 and 116. As shown, the heads have passages communicating with the bore 98 controlled by the respective valves 106 and 108, and suitably secured to the heads are leak-proof cups.

The chamber 56 and the web 58 therein and the chambers 86 and 88 and the cover plates 90 and 92 for the chambers 86 and 88 are transversely bored to support shafts 122 and 124. The shaft 122 has secured thereto an arm 126 extending into the slot in the shifting rod 44 and an arm 128 extending into the slot in the piston 94. The shaft 124 has similar arms engaging the shifting rod 46 and the piston 96. Because of this structure, upon movement of the piston 94 or 96 corresponding movement of the shifting rod 44 or 46 is accomplished.

The fluid pressure producing means or the actuating mechanism comprises a casting including two pairs of opposed cylinders 134, 136, 138 and 140 arranged in spaced parallel relation, a superimposed reservoir 142 connecting the cylinders, and a dependent chamber 144 communicating with the reservoir. The cylinders are provided with removable heads 146, 148, 150 and 152. The reservoir has an open top, closed as by a cover plate 154, having a filling opening closed by a plug 156. The dependent chamber has an open end to which is fitted a cap 158 provided with ducts 160, 162, 164 and 166.

The duct 166 communicates with a passage 168 leading to a port 170 in the cylinder 136 adjacent to the head thereof; the duct 162 communicates with a passage 172 leading to a port 174 in the cylinder 134 adjacent to the head thereof; the duct 164 communicates with a passage 176 leading to a port 178 in the cylinder 140 adjacent to the head thereof; and duct 160 communicates with a passage 180 leading to a port 182 in the cylinder 138 adjacent to the head thereof.

Pistons 184 and 186 are positioned for reciprocation in the respective pairs of opposed cylinders. These pistons have secured to their respective ends leak-proof cups 188, 190, 192 and 194. The pistons are respectively notched as indicated at 196 and 198 for the reception of a slidable pin 200 for retaining the pistons in shifted position, and notches 202 and 204, the purpose of which will hereinafter appear.

Positioned transversely of the reservoir 142 is a rotatable and axially movable shaft 206 movable through an operating lever 208. As shown, the shaft 206 has a flat portion to which is clamped or otherwise secured an arm 210 supporting a pin 212 adapted to engage the notch 202 in the piston 184 or the notch 204 in the piston 186. The free end of the arm 210 has thereon a cam 214 provided with a plurality of notches 216, 218 and 220 for retaining the cam and consequently the operating lever in shifted position. This cam cooperates with the stem of a spring-pressed valve 222 controlling the ducts 160, 162, 164 and 166 in the head or cap 158 on the chamber 144, and the valve stem is fitted in the chamber with sufficient clearance to maintain a constant communication between the chamber and the reservoir.

The passage 172 leading to the port 174 in the cylinder 134 is connected by a pipe line 224 to a port in the cylinder 68 of the actuated mechanism; the passage 168 leading to a port 170 in cylinder 136 is connected by a pipe line 226 to a port in cylinder 66 of the actuated mechanism; the passage 180 leading to a port 182 in cylinder 138 is connected by a pipe line 228 to a port in cylinder 64 of the actuating mechanism; and the passage 176 leading to a port 178 in cylinder 140 is connected by a pipe line 230 to cylinder 62.

Assuming that the system is filled with a suitable hydraulic fluid and that it is desired to shift the transmission to the reverse position, the operating lever 208 is manipulated to engage the pin 212 with the slot 202 in the piston 184 and is then moved in the direction indicated by the arrow designated "R" to reciprocate the piston 184 and thereby displace the fluid in cylinder 136.

The fluid is displaced from the cylinder 136 through the pipe line 226 into cylinder 66 causing pressure on the head 118 of the piston 96, thereby moving the piston 96, and this movement is transmitted through interconnecting means to the shifting rod 46. During this movement of the piston 96, the fluid in cylinder 68 is displaced through the pipe line 224 into the cylinder 134, and at the end of the stroke of the piston 96 the valve in the head 120 is opened to relieve any excess of pressure on the pipe line 226.

During movement of the operating lever to the position indicated "R", the valve 222 is moved to close the ducts 160, 162, 164 and 166 leading from the reservoir to the passages 168, 172, 176 and 180. The valve is opened at the end of the stroke to relieve any pressure in the pipe lines due to expansion of the fluid or to supply any decrease in the fluid due to contraction caused by lower temperature, and upon return of the operating lever to normal position the valve 222 is again opened to relieve any pressure in the pipe lines and to return excess fluid due to expansion to the supply reservoir.

When it is desired to shift the transmission gears to the first forward speed position, the operating lever 208 is moved inward to engage the pin 212 in the notch 202 in the piston 184 and then in the direction of the arrow indicated "F" to move the piston 184 and thereby displace the fluid in the cylinder 134 through the pipe line 224 into the cylinder 84. This movement of the piston 184 causes movement of the piston 96 and this movement of the piston 96 is transmitted through suitable connections to the rod 46 to shift the transmission gears to the first speed position.

During this movement of the piston 96, the fluid in the cylinder 66 is displaced through the pipe line 226 into the cylinder 136, and at the end of the stroke of piston 96 the valve in the head 118 of the piston is opened to relieve any excess pressure in the pipe line 224. Upon this movement of the piston 96 the valve 222 is moved to close the ducts connecting the reservoir 142 to the passageways 168, 172, 176 and 180, and is again moved to open the ducts at the end of the stroke of the piston to relieve pressure. When the operating lever is returned to normal position, the valve is opened to relieve any pressure on the pipe lines.

Now, when it is desired to shift the transmission gears to the second forward speed position, the operating lever 208 is manipulated to move the pin 202 into engagement with notch 204 in the piston 186 and then in the direction indicated by the arrow designated "S" to move the piston 186 to displace the fluid in cylinder 140 through pipe line 230 into cylinder 62, thereby causing piston 94 to move in cylinder 64 and through suitable connections to move rod 44 to shift the gears to the second speed position.

During this movement the fluid in cylinder 64 is displaced through pipe line 228 into cylinder 138. At the end of the stroke of piston 94 in cylinder 64, the valve in head 116 of the piston is opened to relieve any excess fluid in pipe line 230. During movement of the operating lever to effect this position of the transmission gears, the valve 222 is closed, and is open at the end of the stroke of the piston, and upon return of the operating lever to normal position this valve 222 is opened to relieve any excess pressure in the pipe lines and to return excess fluid to the reservoir.

When it is desired to shift the gears to the third or high speed position, the operating lever 208 is manipulated to shift the pin 212 to engage the notch 204 in the piston 186 and then in the direction indicated by the arrow designated "H". This movement of the operating lever reciprocates the piston 186 to displace fluid in the cylinder 138 through the pipe line 228 into the cylinder 64, causing pressure on the head of piston 94 to move this piston and to move through suitable connections the rod 44 to shift the transmission gears to the high speed position. In this movement the fluid in cylinder 62 is displaced through the pipe line 230 to the cylinder 140, and at the end of the stroke of piston 94 the valve in the head 114 of the piston 94 is opened to relieve any excess fluid in the pipe line 228. During this movement the valve 222 closes the ducts connecting the passages to the reservoir and at the end of the stroke the valve is opened. Upon shifting the operating lever to the normal position, the valve is again opened to relieve any pressure on the pipe lines and to return any excess fluid to the reservoir.

While a preferred embodiment of the invention has been described, it is to be understood that this is given merely as an example of the underlying principles of the invention, and since these principles may be incorporated in other specific mechanical structures I do not intend to be limited to the structure shown except where such limitations are clearly imposed by the appended claims.

Having thus described the various features of the invention, what I claim as new and desire to secure by Letters Patent is:—

1. A gear shifting mechanism comprising a cover plate, a shifting element supported by the plate, a cylinder arranged in parallel relation to the shifting element, a piston movable in the cylinder, said piston having a longitudinal passage providing a communication between the respective ends of the cylinder, a head on each end of the piston having an orifice registering with the passage, valves in the piston controlling the orifices in the heads, a shaft arranged transversely of the shifting element and the piston, and arms on the shaft engaging the shifting element and piston respectively.

2. A gear shifting mechanism comprising a cover plate, shifting rods supported thereby, cylinders on the cover plate arranged in parallel relation to one another and to the shifting rods, heads on the respective ends of the cylinders, pistons movable in the cylinders having longitudinal passages providing communications between the respective ends of the respective cylinders, heads on the respective ends of the pistons having openings registering with the passages in the pistons, valves in the respective ends of said pistons controlling the openings in the heads of the pistons, means carried by the cylinder heads for tripping the respective valves at the end of the stroke of the respective pistons, shafts arranged transversely to the shifting rods and the pistons, and arms keyed to the shafts engaging the pistons and shifting rods.

3. A gear shifting mechanism comprising fluid pressure means including a reservoir, parallel cylinders supported thereby, pistons movable in the cylinders, passages connecting the reservoir to the cylinders, a valve controlling the passages, and manually operated means including means in the reservoir for selectively actuating the pistons and concomitantly closing the valve.

4. A gear shifting mechanism comprising fluid pressure means including a reservoir, parallel cylinders formed integral therewith, passages connecting the reservoir to the cylinders, pistons movable in the cylinders, heads on the respective ends of the pistons, means for locking either of the pistons against movement during movement of the other, hand operated means for selectively actuating the pistons including means for closing the passages connecting the reservoir to the cylinders during movement of either of the pistons.

5. A gear shifting mechanism comprising fluid pressure means including a reservoir, cylinders formed integral therewith, passages connecting the cylinders to the reservoir, a valve controlling the passages, pistons movable in the cylinders, heads on the respective ends of the pistons, leakproof cups on the heads, a slidable rockable shaft arranged transversely to the pistons, means on the shaft within the reservoir for selectively engaging the pistons including a cam for actuating the valve and hand operated means for manipulating the shaft to selectively actuate the pistons and to concomitantly close the valves.

6. A gear shifting mechanism comprising a fluid pressure device including a reservoir, parallel cylinders in the bottom thereof, a chamber communicating with the reservoir, passages providing communications between the chamber and the cylinders, a valve in the chamber for control of the passages, pistons movable in the cylinders, and means in the reservoir for selectively actuating the pistons and concomitantly closing the valve.

7. A gear shifting mechanism comprising fluid actuated members, means connecting the members to the shifting elements of the mechanism, a fluid pressure device including a reservoir, parallel cylinders supported in the bottom thereof, a fluid pressure delivery means connecting the respective ends of the cylinders to the fluid actuated members, a chamber communicating with the reservoir and depending from the bottom thereof between the cylinders, passages providing communication between the chamber and the cylinders, a valve controlling the passages, double end pistons movable in the cylinders, and means in the reservoir for selectively actuating the pistons including means for actuating the valve.

ANDREW O. McCOLLUM.